US006612546B2

(12) United States Patent
Young et al.

(10) Patent No.: US 6,612,546 B2
(45) Date of Patent: Sep. 2, 2003

(54) GATE VALVE WITH DELAYED RETRACTION OF COUNTER PLATE

(75) Inventors: Steven P. Young, Billerica, MA (US); Vaclav Myslivec, Tyngsborough, MA (US)

(73) Assignee: Varian, Inc., Palo Alto, CA (US)

( * ) Notice: Subject to any disclaimer, the term of this patent is extended or adjusted under 35 U.S.C. 154(b) by 0 days.

(21) Appl. No.: 09/920,160

(22) Filed: Aug. 1, 2001

(65) Prior Publication Data

US 2003/0025098 A1 Feb. 6, 2003

(51) Int. Cl.⁷ .............................................. F16K 25/00
(52) U.S. Cl. ....................................... 251/195; 251/158
(58) Field of Search ................................ 251/193, 195, 251/197, 198, 199, 200, 201, 202, 158, 326, 327, 328, 329

(56) References Cited

U.S. PATENT DOCUMENTS

| | | | | |
|---|---|---|---|---|
| 2,876,986 A | * | 3/1959 | Knox | 251/200 |
| 2,986,371 A | * | 5/1961 | Knox | 251/197 |
| 3,027,135 A | * | 3/1962 | Kellar | 251/199 |
| 3,216,694 A | * | 11/1965 | Perazone | 251/158 |
| 3,368,792 A | | 2/1968 | Schertler | |
| 4,052,036 A | | 10/1977 | Schertler | |
| 4,291,861 A | | 9/1981 | Faria | |
| 4,314,579 A | | 2/1982 | Wheatley et al. | |
| 4,408,634 A | * | 10/1983 | Peacock | 251/197 |
| 4,470,576 A | | 9/1984 | Schertler | |
| 4,480,659 A | | 11/1984 | Peacock | |
| 4,487,393 A | | 12/1984 | Eagen | |
| 4,560,141 A | * | 12/1985 | Bosch | 251/197 |
| 4,817,915 A | | 4/1989 | Tinner | |
| 5,269,491 A | | 12/1993 | Reynolds | |
| 5,379,983 A | | 1/1995 | Geiser | |
| 5,626,324 A | | 5/1997 | Nakamura et al. | |
| 5,722,636 A | | 3/1998 | Houston | |

FOREIGN PATENT DOCUMENTS

| | | |
|---|---|---|
| DE | 420 047 | 10/1925 |
| DE | 100 25 615 A | 1/2001 |

* cited by examiner

*Primary Examiner*—Gene Mancene
*Assistant Examiner*—John Bastianelli
(74) *Attorney, Agent, or Firm*—William R. McClellan; Bella Fishman

(57) ABSTRACT

A valve, such as a gate valve, includes a housing having a fluid conduit and defining a valve seat and a support surface, a seal plate, a counter plate, an actuator for moving the seal plate and the counter plate between an open position and a closed position, and a coupling mechanism operatively coupled between the seal plate, the counter plate, and the actuator. The seal plate is in sealed engagement with the valve seat, and the counter plate is in engagement with the support surface in the closed position. The coupling mechanism retracts the counter plate from the support surface subsequent to retraction of the seal plate from the valve seat as the valve is opened.

16 Claims, 3 Drawing Sheets

GATE VALVE WITH DELAYED RETRACTION OF COUNTER PLATE

FIELD OF THE INVENTION

This invention relates to valve structures and, more particularly, to gate valve structures wherein retraction of a counter plate is delayed relative to retraction of a seal plate to permit pressure equalization and to reduce wear on seal surfaces.

BACKGROUND OF THE INVENTION

Conventional gate valve structures include a valve housing having a fluid conduit and a valve seat, a seal plate that is movable between an open position and a closed position in the fluid conduit, and an actuator mechanism for moving the seal plate between the open and closed positions. The seal plate engages the valve seat and seals the fluid conduit in the closed position. The seal plate may be moved from the closed position to a retracted position and then moved linearly to the open position.

Gate valves are used in a wide variety of applications. Different applications may involve liquids, gases, and vacuum. Many applications require a long operating life, with frequent cycling between the open and closed positions, and low particulate generation. An example of such an application is in equipment for processing of semiconductor wafers. As semiconductor device geometries decrease in size and circuit densities increase, semiconductor wafers are increasingly sensitive to particulate contamination. Components within the vacuum envelope of the processing chamber, such as gate valves, are potential sources of particulate contamination. Furthermore, the failure of a gate valve may require all or part of a semiconductor fabrication line to shut down, thereby adversely affecting throughput. Accordingly, long operating life and low particulate generation are important gate valve characteristics.

Another potential problem with gate valves relates to the shock and vibration that may occur when the valve is opened or closed. The shock and vibration may damage or disrupt the operation of sensitive equipment in proximity to the gate valve. It has been observed that the shock produced by the operation of prior art gate valves may jar loose the charcoal from the inside of cryogenic vacuum pumps. Accordingly, it is desirable to limit shock and vibration produced by gate valves.

A gate valve having an linearly movable seal plate is disclosed in U.S. Pat. No. 4,052,036 issued Oct. 4, 1977 to Schertler. The seal plate and a counter plate are biased toward each other by leaf springs. The actuator carries a series of rollers which engage recesses in the seal plate and the counter plate. When the seal plate and the counter plate reach a stop position, the actuator continues to move, forcing the rollers out of the recesses and moving the seal plate and the counter plate toward the closed position. The seal plate engages a valve seat, and the counter plate engages a support surface. The counter plate provides support for the seal plate in the closed position and prevents the seal plate from being forced away from the valve seat by a pressure differential across the valve.

When gate valves of this design are opened, the seal plate and the counter plate are retracted simultaneously. This leaves the seal plate unsupported when the seal between the seal plate and the valve seat is broken. In the presence of a pressure differential across the valve, the unsupported seal plate is forced into the rollers and the counter plate. This causes a shock which may damage sensitive components and which may loosen particles in the system. In addition, the elastomer ring on the seal plate may be subjected to scuffing or rubbing as the seal plate is retracted from the valve seat. Such scuffing or rubbing may produce in wear of the elastomer ring and reduce the operating life of the gate valve.

Accordingly, there is a need for improved gate valve structures.

SUMMARY OF THE INVENTION

According to a first aspect of the invention, a valve is provided. The valve comprises a valve housing having a fluid conduit and defining a valve seat and a support surface, a seal plate, a counter plate, an actuator for moving the seal plate and the counter plate between an open position and a closed position, and a coupling mechanism operatively coupled between the seal plate, the counter plate, and the actuator. The seal plate is in sealed engagement with the valve seat, and the counter plate is in engagement with the support surface in the closed position. The coupling mechanism retracts the counter plate from the support surface subsequent to retraction of the seal plate from the valve seat as the valve is opened.

In one embodiment, the coupling mechanism comprises one or more seal plate grooves in the seal plate, one or more counter plate grooves in the counter plate, roller elements movably mounted in the actuator, and one or more springs for biasing the seal plate and the counter plate toward retracted positions. The roller elements move along the seal plate grooves and the counter plate grooves as the actuator moves toward or away from the closed position. The seal plate grooves and the counter plate grooves each have a shallow portion and a deep portion. Transitions between shallow portions and deep portions in the seal plate grooves are offset in a direction of actuator movement relative to transitions between shallow portions and deep portions in the counter plate grooves. In one embodiment, the seal plate grooves and the counter plate grooves each have a relatively abrupt transition between the shallow portion and the deep portion. In another embodiment, the seal plate grooves each have a relatively gradual transition between the shallow portion and the deep portion, and the counter plate grooves each have a relatively abrupt transition between the shallow portion and the deep portion.

According to another aspect of the invention, a method is provided for operating a gate valve wherein a seal plate engages a valve seat and a counter plate engages a support surface in a closed position. The method comprises the steps of retracting the seal plate from the valve seat and retracting the counter plate from the support surface subsequent to retraction of the seal plate from the valve seat.

By retracting the seal plate from the valve seat before the counter plate is retracted from the support surface, any pressure differential across the valve is allowed to equalize. Thus slamming of the counter plate against the support surface is avoided when the seal is broken. In addition, the seal plate is retracted from the valve seat substantially perpendicular to the valve seat, and rubbing and wear of the seal surfaces are limited.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
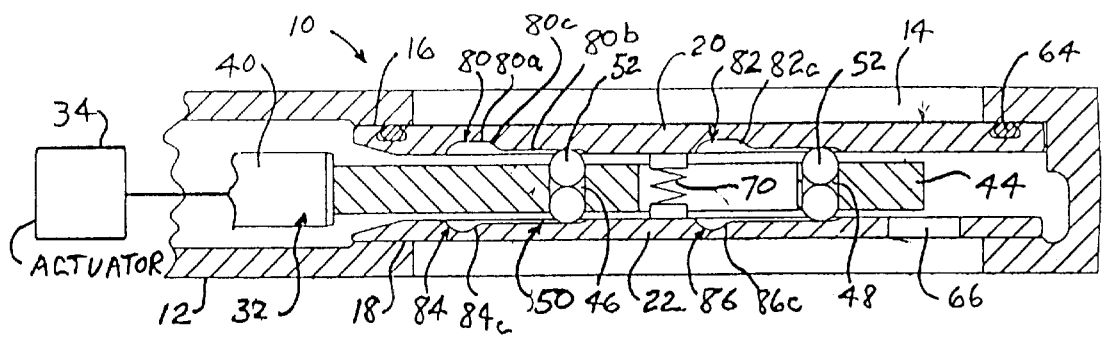
FIG. 1 is a partial, cross-sectional side view of a first embodiment of a gate valve in accordance with the invention, shown in a closed position.

A first embodiment of a gate valve in accordance with the present invention is shown in FIGS. 1–5. Like elements in FIGS. 1–5 have the same reference numerals.

A gate valve 10 includes a valve housing 12 having a fluid conduit 14 for passage of a gas or a liquid and a flange 15 for attachment of the valve to other system components. The gas pressure may be low in the case of vacuum applications of the gate valve. Valve housing 12 defines a valve seat 16 for engagement with a seal plate, as described below. Valve housing 12 also defines a support surface 18 for engagement with a counter plate, as further described below. Fluid conduit 14 may be generally cylindrical, square, rectangular or any other suitable shape. Valve seat 16 and support surface 18 may each have the form of a surface that surrounds fluid conduit 14.

Gate valve 10 further includes a seal plate 20, a counter plate 22 and an actuator assembly 32, and may include a valve actuator 34, such as an air cylinder. In an alternate configuration, actuator 34 is replaced with a handle or other suitable device for manual operation of the gate valve. Actuator assembly 32 includes a shaft 40 connected at one end to valve actuator 34. The opposite end of shaft 40 is connected to an actuator element 44.

Seal plate 20 and counter plate 22 are positioned on opposite sides of actuator element 44. An elastomer ring 64 is mounted in a groove in seal plate 20 for producing a vacuum-tight seal between valve seat 16 and seal plate 20 when the valve is closed. Counter plate 22 is in contact with support surface 18 in the closed position, as shown in FIG. 1. Counter plate 22 may include a vent hole 66 for rapid pressure equalization.

A coupling mechanism 50 is disposed between actuator element 44, seal plate 20 and counter plate 22. Coupling mechanism 50 controls movement of seal plate 20 and counter plate 22 between closed and retracted positions, as described below. As described below, coupling mechanism 50 includes rollers 52, grooves in seal plate 20 and counter plate 22, and one or more springs connected between seal plate 20 and counter plate 22. Rollers 52, which may be balls, are movably mounted in openings 46 and 48 in actuator element 44.

Coupling mechanism 50 includes at least one spring 70, which is attached at one end to seal plate 20 and is attached at the other end to counter plate 22. Spring 70 biases seal plate 20 and counter plate 22 toward each other. When the valve is closed, spring 70 is deformed, as shown in FIG. 1, thereby producing a restoring force that tends to pull seal plate 20 and counter plate 22 toward each other. It will be understood that leaf springs, Belleville springs, coil springs or any other suitable springs may be utilized within the scope of the present invention.

Seal plate 20 is provided with a groove 80 and a groove 82. Counter plate 22 is provided with a groove 84 and a groove 86. Grooves 80, 82, 84 and 86 are positioned and shaped to engage the respective rollers 52. Each of the grooves has a deep portion that defines a retracted position of the respective plate, a shallow portion that defines the closed position of the respective plate and a transition between the deep portion and the shallow portion. For example, groove 80 includes a deep portion 80a, a shallow portion 80b and a transition 80c between deep portion 80a and shallow portion 80b.

Figure 2:
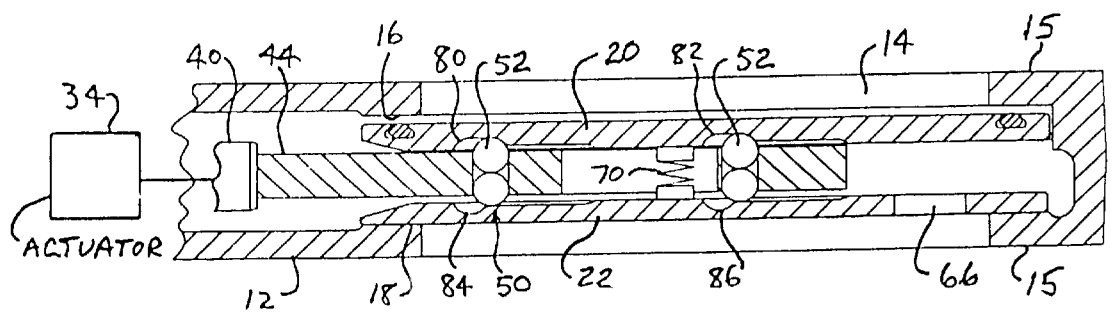
FIG. 2 is a partial, cross-sectional side view of the valve of FIG. 1, shown in a first retracted position.
Figure 3:
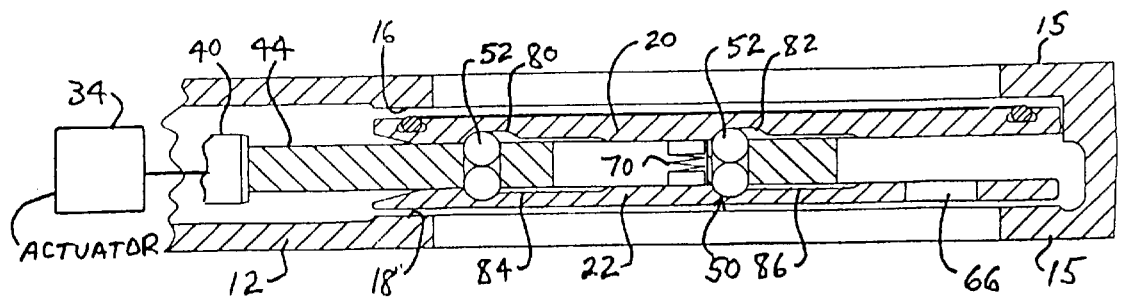
FIG. 3 is a partial, cross-sectional side view of the valve of FIG. 1, shown in a second retracted position.
Figure 4:
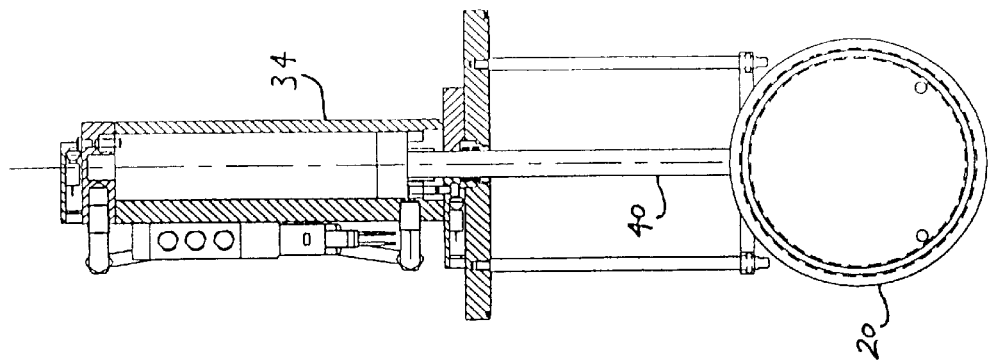
FIG. 4 is a front view of the valve of FIG. 1.

Under control of actuator assembly 32 and valve actuator 34, seal plate 20 and counter plate 22 are movable between a closed position shown in FIG. 1, retracted positions shown in FIGS. 2 and 3 and an open position (not shown). In the open position, seal plate 20 and counter plate 22 are moved away from fluid conduit 14 into an upper portion 12a (FIG. 4) of valve housing 12 to permit passage of a liquid or a gas. In the closed position, seal plate 20 is in sealed engagement with valve seat 16, thereby blocking passage of a liquid or a gas through fluid conduit 14. The retracted positions of FIGS. 2 and 3 are discussed in detail below.

In operation, shaft 40 moves seal plate 20, counter plate 22 and actuator element 44 from the closed position shown in FIG. 1 to the first retracted position shown in FIG. 2 and then to the second retracted position shown in FIG. 3. In the closed position shown in FIG. 1, rollers 52 engage the shallow portions of grooves 80, 82, 84 and 86. This causes seal plate 20 to be in sealed engagement with valve seat 16 and causes counter plate 22 to be in engagement with support surface 18. Counter plate 22 provides support for seal plate 20 in the closed position and prevents a pressure differential across the valve 10 from forcing seal plate 20 away from engagement with valve seat 16.

Coupling mechanism 50 is configured to provide advantageous movement of seal plate 20 and counter plate 22 as the valve is opened. In particular, the valve is opened by energizing actuator 34 and moving shaft 40 and actuator element 44 to the left in FIGS. 1–3. FIG. 2 illustrates movement to a first retracted position wherein seal plate 20 is retracted from valve seat 16 and counter plate 22 remains in engagement with support surface 18. In the first retracted position, the valve seal is broken, and any pressure differential across the valve is allowed to equalize. Because counter plate 22 remains in engagement with support surface 18, the retraction of seal plate 20 from valve seat 16 is substantially perpendicular to valve seat 16, and rubbing and wear of elastomer ring 64 are limited. Furthermore, slamming of counter plate 22 against support surface 18 is avoided, because counter plate 22 remains in engagement with support surface 18 in the first retracted position of FIG. 2.

As shaft 40 and actuator element 44 are moved further to the left, the valve assumes a second retracted position, as shown in FIG. 3, wherein seal plate 20 is retracted from valve seat 16 and counter plate 22 is retracted from support surface 18. Seal plate 20 and counter plate 22 can then be moved to the open position away from fluid conduit 14 or to a partially open position. Thus, coupling mechanism 50 is configured such that counter plate 22 is retracted from support surface 18 subsequent to retraction of seal plate 20 from valve seat 16. The delay between the retraction of seal plate 20 from valve seat 16 and the retraction of counter plate 22 from support surface 18 depends on the speed of actuator 34 and on the design of coupling mechanism 50. The delay is preferably selected to be sufficient to allow any pressure differential across the valve to equalize.

The operation of coupling mechanism 50 to provide valve operation as shown in FIGS. 1–3 is now described. As illustrated, grooves 80 and 82 in seal plate 20 have deep portions that are elongated in the direction of actuator travel and have transitions 80c and 82c, respectively, between deep portions and shallow portions that are offset in the direction of actuator travel relative to transitions 84c and 86c in grooves 84 and 86, respectively. As actuator element 44 is moved to the left during valve opening, rollers 52 move along the shallow portions of the respective grooves 80, 82, 84 and 86, with seal plate 20 and counter plate 22 initially remaining fixed in their closed positions. Transitions 80c and 82c are offset relative to transitions 84c and 86c such that rollers 52 first engage the deep portions of grooves 80 and 82 in seal plate 20, as shown in FIG. 2. Spring 70 causes seal plate 20 to be retracted from valve seat 16. In the first retracted position of FIG. 2, rollers 52 remain in the shallow portions of grooves 84 and 84 in counter plate 22, and counter plate 22 remains in engagement with support surface 18.

As the actuator element 44 is moved further to the left, as shown in FIG. 3, rollers 52 move into the deep portions of grooves 84 and 86, and counter plate 22 is retracted from support surface 18. During this movement, rollers 52 move along the elongated deep portions of grooves 80 and 82 in seal plate 20, and seal plate 20 remains in the retracted position. Spring 70 holds seal plate 20 in the deep portions of grooves 80 and 82 and holds counter plate 22 in the deep portions of grooves 84 and 86 as seal plate 20 and counter plate 22 are moved toward the open position. Thus, the arrangement of rollers 52 and grooves 80 and 82, which have transitions offset from the transitions in grooves 84 and 86, provide the desired movement shown in FIGS. 1–3.

It will be understood that different mechanisms may be utilized to achieve the valve motion illustrated in FIGS. 1–3 and described above. For example, the rollers which engage the grooves in seal plate 20 may be offset from the rollers which engage the grooves in counter plate 22. Furthermore, different groove shapes and roller types may be utilized within the scope of the invention. The coupling mechanism, in general, causes the counter plate to be retracted from the support surface subsequent to retraction of the seal plate from the valve seat.

Figure 5:
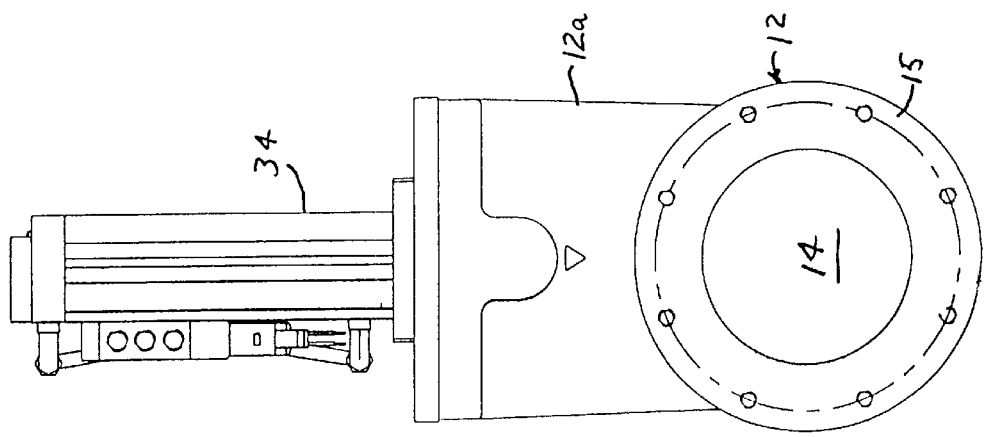
FIG. 5 is a front view, partly in cross section, of the seal plate and actuator of the valve of FIG. 1.
Figure 6:
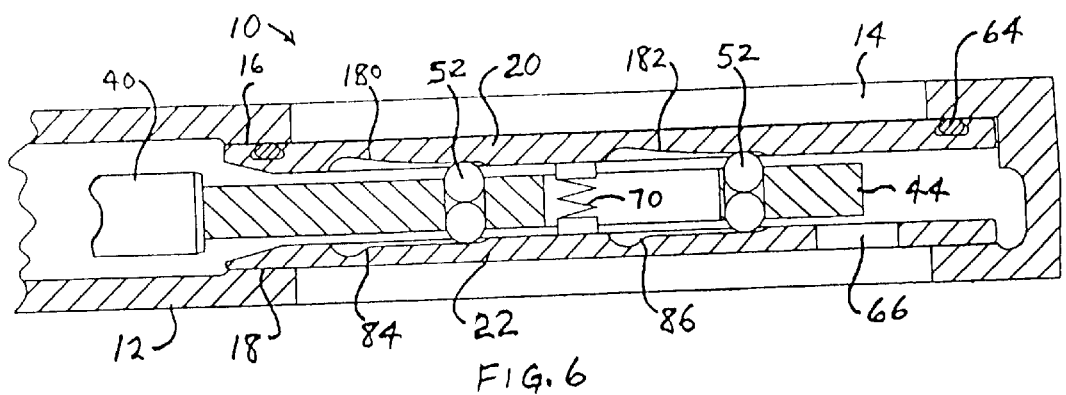
FIG. 6 is a partial, cross-sectional side view of a second embodiment of a gate valve in accordance with the invention, shown in a closed position.
Figure 7:
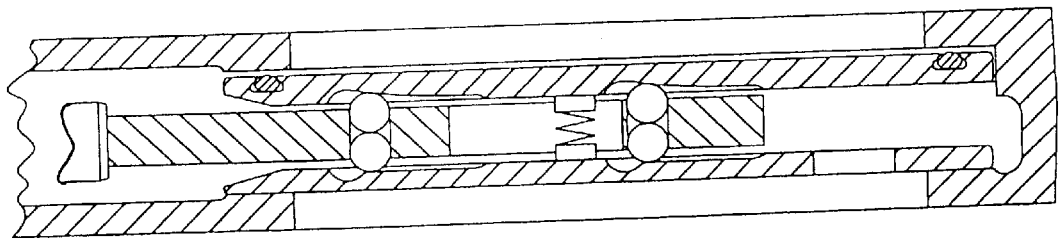
FIG. 7 is a partial, cross-sectional side view of the valve of FIG. 6, shown in a first retracted position.
Figure 8:
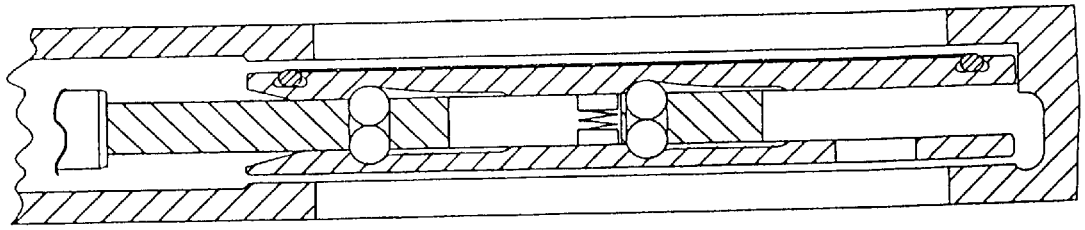
FIG. 8 is a partial, cross-sectional side view of the valve of FIG. 6, shown in a second retracted position.

A second embodiment of a gate valve in accordance with the invention is shown in FIGS. 6–8. Like elements in FIGS. 1–8 have the same reference numerals. The embodiment of FIGS. 6–8 differs from the embodiment of FIGS. 1–3 primarily with respect to the shape of the grooves in seal plate 20. In the embodiment of FIGS. 1–3, grooves 80 and 82 in seal plate 20 and grooves 84 and 86 in counter plate 22 have relatively abrupt transitions 80c, 82c, 84c and 86c between the shallow portions and the deep portions. In the embodiment of FIGS. 6–8, seal plate 20 is provided with grooves 180 and 182 having ramps, or gradual transitions, between shallow portions and deep portions. This permits seal plate 20 to be retracted from valve seat 16 with a smooth, non-abrupt movement. As in the embodiment of FIGS. 1–3, seal plate 20 is first retracted from valve seat 16, as shown in FIG. 5, and, subsequently, counter plate 22 is retracted from support surface 18, as shown in FIG. 6. It will be understood that the grooves in seal plate 20 and counter plate 22 can have a variety of configurations within the scope of the invention.

It should be understood that various changes and modifications of the embodiments shown in the drawings described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A valve comprising:
   a valve housing having a fluid conduit and defining a valve seat and a support surface;
   a seal plate;
   a counter plate;
   an actuator for moving said seal plate and said counter plate between an open position and a closed position, wherein said seal plate is in sealed engagement with the valve seat and said counter plate is in engagement with the support surface in the closed position; and
   a coupling mechanism operatively coupled between said seal plate, said counter plate and said actuator for retracting said counter plate from the support surface subsequent to retraction of said seal plate from the valve seat as the valve is opened and before said counter plate and said seal plate are moved in a direction of movement of said actuator as the valve is opened.

2. A valve as defined in claim 1 wherein said coupling mechanism comprises one or more seal plate grooves in said seal plate, one or more counter plate grooves in said counter plate, roller elements movably mounted in said actuator, and one or more springs for biasing said seal plate and said counter plate toward retracted positions, wherein said roller elements move along said seal plate grooves and said counter plate grooves as said actuator moves toward or away from the closed position.

3. A valve as defined in claim 2 wherein said seal plate grooves and said counter plate grooves each have a shallow portion and a deep portion, wherein transitions between shallow portions and deep portions in said seal plate grooves are offset in a direction of actuator movement relative to transitions between shallow portions and deep portions in said counter plate grooves.

4. A valve as defined in claim 3 wherein said seal plate grooves and said counter plate grooves each have a relatively abrupt transition between the shallow portion and the deep portion.

5. A valve as defined in claim 3 wherein said seal plate grooves each have a relatively gradual transition between the shallow portion and the deep portion, and said counter plate grooves each have a relatively abrupt transition between the shallow portion and the deep portion.

6. A valve as defined in claim 1 wherein said valve housing and said seal plate are configured as a gate valve.

7. A valve as defined in claim 1 wherein said roller elements comprise balls.

8. A valve as defined in claim 1 wherein said counter plate includes at least one vent hole.

9. A method for operating a gate valve wherein a seal plate engages a valve seat and a counter plate engages a support surface in a closed position, comprising the steps of:
   providing a coupling mechanism operatively coupled between the seal plate, the counter plate, and an actuator for retracting the seal plate and the counter plate retracting the seal plate from the valve seat;
   retracting the counter plate from the support surface subsequent to retraction of the seal plate from the valve seat; and moving the seal plate and the counter plate toward an open position subsequent to retraction of the counter plate from the support surface.

10. A method as defined in claim 9 wherein the step of retracting the seal plate comprises retracting the seal plate in a direction substantially perpendicular to the valve seat.

11. A method as defined in claim 9 further comprising the step of moving the seal plate and the counter plate to an open position subsequent to retraction of the counter plate from the support surface.

12. A gate valve comprising:

a valve housing having a fluid conduit and defining a valve seat and a support surface;

a seal plate;

a counter plate;

an actuator for moving said seal plate and said counter plate between an open position and a closed position, wherein said seal plate is in sealed engagement with the valve seat and before said counter plate and said seal plate are moved in a direction of movement of said actuator as the valve is opened and said counter plate is in engagement with the support surface in the closed position; and means for retracting said counter plate from the support surface after said seal plate is retracted from the valve seat.

13. A gate valve as defined in claim 12 wherein said means for retracting comprises one or more seal plate grooves in said seal plate, one or more counter plate grooves in said counter plate, roller elements mounted in said actuator, and one or more springs for biasing said seal plate and said counter plate toward each other, wherein said roller elements move along said seal plate grooves and said counter plate grooves as said actuator moves toward or away from the closed position.

14. A gate valve a defined in claim 13 wherein said seal plate grooves and said counter plate grooves each have a shallow portion and deep portion, wherein transitions between shallow portions and deep portions in said seal plate grooves are offset in a direction of actuator movement relative to transitions between shallow portions and deep portions in said counter plate grooves.

15. A gate valve as defined in claim 14 wherein said seal plate grooves and said counter plate grooves each have a relatively abrupt transition between the shallow portion and the deep portion.

16. A gate valve as defined in claim 14 wherein said seal plate grooves each have a relatively gradual transition between the shallow portion and the deep portion, and said counter plate grooves each have a relatively abrupt transition between the shallow portion and the deep portion.

* * * * *